March 28, 1967 R. J. SLATER 3,311,328
TAILORED WOVEN GORES FOR HEAVY LOAD BALLOON
Filed April 19, 1965
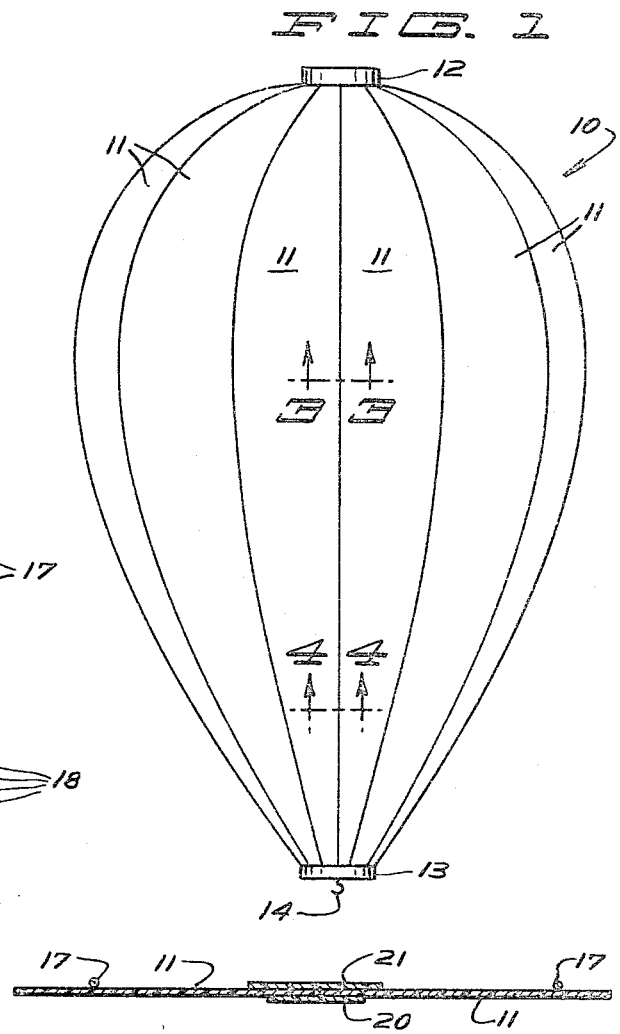
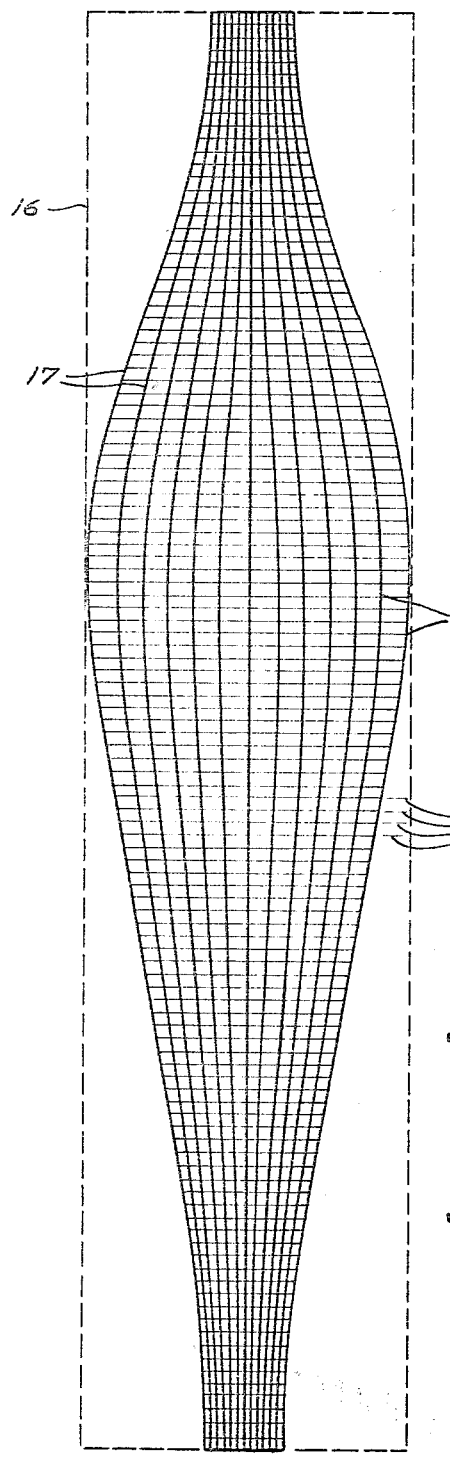
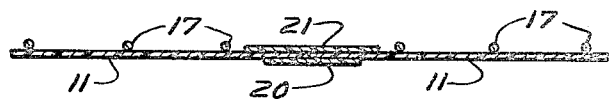
INVENTOR.
RICHARD J. SLATER
BY Meyers & Peterson
ATTORNEYS

United States Patent Office 3,311,328
Patented Mar. 28, 1967

3,311,328
TAILORED WOVEN GORES FOR HEAVY LOAD BALLOON
Richard J. Slater, Northfield, Minn., assignor to G. T. Schjeldahl Company, Northfield, Minn., a corporation of Minnesota
Filed Apr. 19, 1965, Ser. No. 449,204
7 Claims. (Cl. 244—31)

The present invention relates generally to an improved balloon vehicle of extremely light weight which is capable of ascending to high altitudes and capable of supporting heavy loads during a flight. The improved balloon vehicle of the present invention is provided with reinforcing which is specifically tailored to efficiently and equally distribute the load across the area of the balloon surface without introducing or placing any added weight, burden or load in the balloon vehicle structure which does not contribute to load carrying capability.

Balloon vehicles are useful in the conducting of many scientific experiments. Many worthwhile experiments either do not require an orbiting vehicle, or are not capable of being so conducted because of the acceleration and rapid motion inherent in rocket propulsion. Many experiments in the field of astronomy are best performed utilizing a balloon vehicle. One major drawback of the balloon vehicle in the field of scientific experiments has been its lack of load carrying capacity and its general unreliability. As a result, many important and costly experimental programs have been curtailed because of repeated balloon failure. The problems or poor reliability and low load carrying capacity have limited the applicability of balloon vehicles to certain scientific experiments particularly high altitude experiments. When heavy pay-loads are being considered, it has been the practice in the past to add load bearing tapes, lines or members to the balloon envelope structure in order to enhance its load carrying capabilities. Unfortunately, as the reinforcement material is added, the overall weight of the vehicle per se is increased, this detracting from the load carrying capacity.

Recently, the availability of a light weight scrim prepared from woven polyester fibers of polyethylene terephthalate, such as Dacron, has made it possible to develop heavy load balloons of exceptionally light weight. The envelope material is preferably of high strength, such as for example stress oriented film prepared from polyethylene terephthalate, available under the trade name of Mylar. Prior to the advent of the scrim materials for balloon vehicles, load tapes attached to the balloon wall were generally provided for assisting in supporting the load. One major drawback of load tapes is that they fail to distribute the load evenly when the balloon is not fully deployed. The scrim reinforced balloon provides uniform strength throughout the balloon and the load supporting strength is not concentrated on the few load tapes which may be maintained under tension. Scrim reinforced materials are also advantageous in that they provide tear stopping capabilities which eliminate catastrophic ruptures or failures. The material is flexible at extremely low temperatures encountered at stratospheric atmospheres.

When load tapes are utilized, there is theoretically no stress across the balloon gores. No transverse reinforcement is therefore necessary and longitudinal threads alone should be ample. However, the absence of a transverse stress only occurs when the balloon is completely inflated, floating at its predetermined altitude. During the processes of inflation and ascent, while the balloon is deploying its fabric, stresses can and do occur in the circumferential direction across the gore surface. It has been found that weight and money can be saved by tailoring the gore material to the actual stress distributions by specifically tailoring the disposition of the threads as required for the individual balloon application. In order to provide the greatest strength at a practical minimum weight, a woven scrim pattern having a substantially uniform number of threads in the warp direction has been found to be preferable.

In this woven pattern, the weft or fill pattern which is disposed transversely across the gores may be at a substantially uniform density. However, for certain balloons, it is desirable to increase the density of this pattern on the upper portions of the balloon where the load carrying stresses are greater. In the warp pattern, the line or thread density is effectively greater at the portions adjacent the longitudinal ends of each gore, and decreases toward the center thereof. Stated another way, the center portion of the gore has a thread density which is less than the density at or along areas adjacent the longitudinal ends of the gores. Substantial strength is available in a balloon fabricated from, for example, one-quarter mil thick film of stress oriented polyethylene terephthalate, such as is commercially available under the trade name of Mylar, and reinforced with woven polyethylene terephthalate fibers, commercially available under the trade name of Dacron, and secured to the surface of the film with an adhesive or flocking agent. By tailoring the reinforcing material, it is possible to place the reinforcing material at the point where it is needed, thereby eliminating the introduction of a substantial quantity of unnecessary weight. It will be appreciated that the heaviest component of the balloon is the reinforcing thread or scrim, and therefore by reducing the number of threads in the balloon by placement where they belong, a weight reduction of a substantial percent can be achieved without risking a sacrifice in overall strength.

The balloon designed in accordance with the teachings of the present invention provides an infinite number of possibilities for load bearing capability by placing the strength at a point where it is needed. This feature provides optimum material design for the balloon designer. A light-weight balloon is thereby provided with homogeneous distribution of the load across the surfaces thereof.

The scrim reinforcement material is preferably bonded to the film of the envelope by means of an adhesive or the like, however, it will be appreciated that this scrim may be heat laminated to the film as well. The scrim may be disposed on one or both major surfaces of the film. As a further alternative, the scrim may be enclosed between a pair of laminated films, if desired. The fibers may be arranged in a basketweave, such as an over and under weave, a lenoweave, or may be merely laid on the surface of the film.

Therefore, it is an object of the present invention to specifically tailor gore configurations so as to secure a maximum utilization of material strength consistent with a minimum weight.

It is still a further object of the present invention to tailor the longitudinal or warp fibers to the maximum utilization of these fibers along the length of the gore.

It is yet a further object of the present invention to provide a substantial density of reinforcing scrim in the longitudinal end portions of the gore, and a reduced density of these fibers along the center of the gore, thereby providing a substantial number of fibers which extend the entire axial length of the gore.

Other and further objects of the present invention will become apparent to those skilled in the art upon a study of the following specification, appended claims and accompanying drawing wherein:

FIGURE 1 is an elevational view of a balloon structure prepared from a plurality of individual gores, the gores being bonded or secured, one to the other, along mutually adjacent lateral edge surfaces;

FIGURE 2 is a top plan view of a gore arranged rectangular film base, the longitudinal or warp fibers of the reinforcement being tailored in accordance with the present invention;

FIGURE 3 is a sectional view taken through the transverse thickness of a pair of gores bonded or secured together along the lateral edges thereof, the view being taken along the line and in the direction of arrows 3—3 of FIGURE 1; and FIGURE 4 is a view similar to FIGURE 3 and taken along the line and in the direction of the arrows 4—4 of FIGURE 1.

In the preferred modification of the present invention, particularly as illustrated in FIGURE 1, it will be seen that a balloon vehicle generally designated 10 is fabricated from a plurality of gores 11—11 which are sealed together along their lateral edges. The balloon vehicle is further provided with a top cap 12 at the top juncture point of each of the gores, and a load ring 13 which is disposed along the bottom of the vehicle and the bottom of the gores. The load ring 13 is secured tautly to each of the individual gore members, and is further provided with a hook 14 for maintaining the pay-load as desired. Load rings of this type are commercially available.

Referring now to the gore configuration in FIGURE 2, it will be seen that the gore 11 is laid out on a rectangular film sheet such as is shown in phantom at 16, the gore member 11 including a plurality of longitudinal or warp fibers 17—17 along with a plurality of horizontal or weft fibers 18—18. The number of and physical arrangement of the longitudinal or warp fibers is such that a tailored effect is given to the gore. The number of longitudinal fibers is constant from the top portion of the gore to the bottom, the spacing being modified or programmed in accordance with the desired lateral position of the fiber on the gore. The individual fibers each comprise a thread element of the like and are generally known in the art as a scrim. These individual fibers 17—17 and 18—18, each of which are secured reasonably firmly to the surface of the gore, are substantially uniform in diameter, the diameter being nominally such that about 22,000 feet of the scrim weighs one pound. In a balloon having a volume of about 5 million cubic feet, with a height of about 365 feet, a total of about 11,350 fibers are required in the longitudinal or warp direction, and a uniform pattern of about 3 per inch are required in the direction transverse thereto. If desired, because of the greater stresses encountered at the upper portion of the balloon structure, the transverse fibers 18—18 may be more closely spaced at the upper portion than at the lower portion of the individual gores.

In one specific structure, utilizing 0.00015 inch thick Mylar film, to which has been adhesively bonded a plurality of Dacron scrim fibers, a 5 million cubic foot balloon having a gore structure such as is shown in FIGURE 2, utilizing 175 gores and capable of carrying a pay-load of 350 pounds to an altitude of 140,000 feet utilized the following pattern: The longitudinal end portions had a thread density of 5 threads per inch, and the center portions had a thread density of about 1 thread per 4 inches of lateral extent. The gore which comprised 0.50 mil stress oriented polyethylene terephthalate (Mylar) was 365 feet in length, and had a maximum width of 56 inches. The center had the high density of fibers and the remaining portions had the low density fiber reinforcement. The horizontal component, that is, the threads in the lateral or weft direction, had a thread density of 3 per inch, these reinforcing fibers running at an angle substantially normal to the axis of the gore. In order to bond the fibers to the film material, the fibers being 220 denier roto set high tenacity Dacron, 22,000 yards of which weigh one pound, an adhesive such as that certain polyester adhesive sold commercially by the G. T. Schjeldahl Company, of Northfield, Minnesota, under the code name of GT 301 has been found to be useful. This adhesive is applied as a thin layer to the surface of the film. Of course, if desired, certain other flocking agents may be used, if desired.

In certain cases, it may be desirable to provide a more highly dense pattern of fill fibers along the upper portion or upper hemisphere of the balloon structure, than along the lower portion or lower hemisphere thereof.

Particular attention is now directed to FIGURE 3 of the drawings wherein the individual gore members 11—11 are shown sealed together at their adjacent lateral edges by means of a pair of adhesive backed tape elements 20 and 21. The adhesive is preferably a thermally sensitive adhesive which is bonded to the tape and when subjected to an elevated temperature may become bonded to the surface of the gore member 11. Tapes of this type are commercially available, such as that certain tape sold by the G. T. Schjeldahl Company, of Northfield, Minn., under the code name GT 201. It will be observed from FIGURE 3 that the longitudinal or warp fibers 17—17 are spaced a substantial distance apart. This is because of the taking of the view at a point in the gore structure where the density is lowest. FIGURE 4 is, of course, similar to FIGURE 3, however, it is taken at a point along the longitudinal axis of the gore where the longitudinal reinforcing density is substantially greater than at the longitudinal axis disposition of FIGURE 3.

While it has been indicated that stress oriented polyethylene terephthalate is the desirable material for this structure, it has been found that other fiber reinforced film materials may be used as well, such as polyethylene, polypropylene, and the like. It will be appreciated that the plastic film portion of the envelope provides the gas barrier, while the scrim portion of the envelope provides the requisite strength.

It may be readily appreciated that balloons fabricated from a gore arrangement such as disclosed herein may be utilized for light weight, high altitude balloons capable of carrying a substantial load. For example, a balloon having an inflated volume of 1.6 million cubic feet may utilize a gore length of 225 feet, with the number of gores required being 110. Each of the gores will be fabricated as indicated hereinabove.

It will, of course, be understood that various changes may be made in the form, details, arrangements and proportions of the parts without departing from the scope of my invention as set forth in the appended claims.

What is claimed:

1. In a balloon comprising a plurality of gores, each having a longitudinal axis extending from one end thereof to the other and being secured together one to another along a line adjacent the lateral edges thereof to define an enclosure structure, each of said gores having a plurality of discrete reinforcing fibers bonded to a surface thereof at spaced points therealong and consisting of a plurality of fill fibers and a plurality of warp fibers, said warp fibers extending generally parallel to the longitudinal axis of said gore and being bonded to the surface of said gore substantially continuously along the extent of the length of each of said warp fibers, the number of said warp fibers secured to said surface at spaced points between said lateral edges being constant along the extent of said longitudinal axis, each of said warp fibers extending continuously from one end of said gore to the other.

2. The balloon enclosure structure as defined in claim 1 being particularly characterized in that a tape means is provided for bonding the mutually adjacent lateral edge surfaces of each of the gores together.

3. The balloon structure as defined in claim 1 being particularly characterized in that said fill fibers are disposed in a more highly dense pattern at points along the upper hemisphere than along the lower hemisphere.

4. The balloon envelope as defined in claim 2 being particularly characterized in that said tape means consists of a pair of tapes secured to opposite surfaces of said gores along the lateral edge surfaces thereof.

5. In a balloon comprising a plurality of gores, each having a longitudinal axis extending from one end thereof to the other and being secured together one to another along a line adjacent the lateral edges thereof to define an enclosure structure, said enclosure structure having the form of a prolate spheroid, each of the gores having a major axis and a minor axis, and having a plurality of discrete reinforcing fibers bonded to a surface thereof at spaced points therealong and consisting of a plurality of fill fibers and a plurality of warp fibers, said warp fibers extending generally parallel to the longitudinal axis of said gore and being bonded to the surface of said gore substantially continuously along the extent of the length thereof, the number of said warp fibers secured to said surface at spaced points between the lateral edges being constant along the extent of said longitudinal axis with the said warp fibers being disposed in a pattern which becomes more dense as one moves from the center of said axis toward the ends thereof, each of said warp fibers extending continuously from one end of said gore to the other.

6. The balloon enclosure structure as defined in claim 5 being particularly characterized in that the warp fiber density is greatest at points adjacent the ends of the longitudinal axes, and is substantially less at a point which is substantially midway between the ends of said longitudinal axis, each of said warp fibers extending continuously from one end of said gore to the other.

7. In a balloon comprising a plurality of gores having a longitudinal axis extending from one end thereof to another and being secured together along a line adjacent the lateral edges thereof to define an enclosure structure, each of said gores having a scrim reinforcement secured to a surface thereof, said reinforcement comprising a plurality of discrete reinforcing fibers disposed in a predetermined pattern at spaced points along said gore surface and including fill fibers and warp fibers, each of said warp fibers extending generally parallel to the longitudinal axis of said gore, the number of said warp fibers secured to said surface at spaced points between said lateral edges being substantially constant at spaced points along the extent of said longitudinal axis, each of said warp fibers extending continuously from one end of said gore to the other.

References Cited by the Examiner
UNITED STATES PATENTS

| | | | |
|---|---|---|---|
| 2,756,948 | 7/1956 | Winzen et al. | 244—31 |
| 2,767,940 | 10/1956 | Melton | 244—31 |

MILTON BUCHLER, *Primary Examiner.*

T. MAJOR, *Assistant Examiner.*